Sept. 22, 1970  P. H. MacMAHON  3,529,792
PRE-ROTATABLE TIRE
Filed May 1, 1968  2 Sheets-Sheet 1
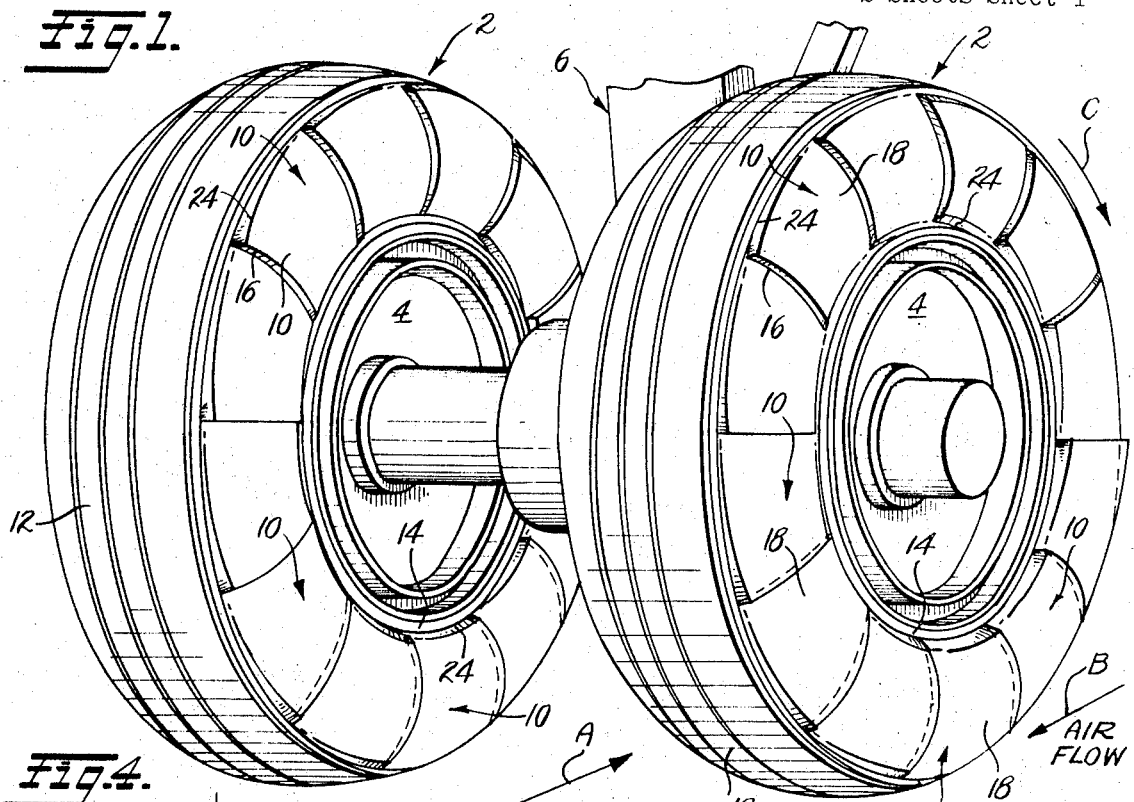
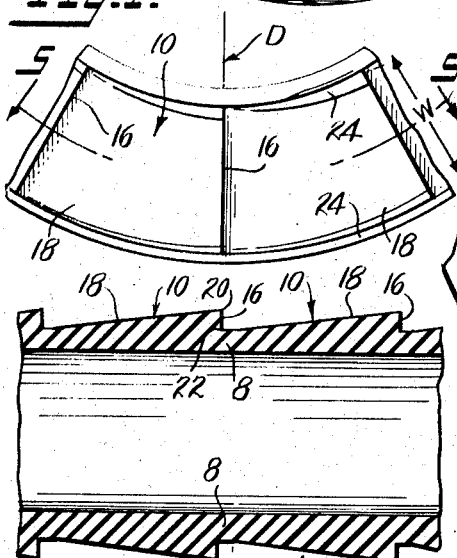
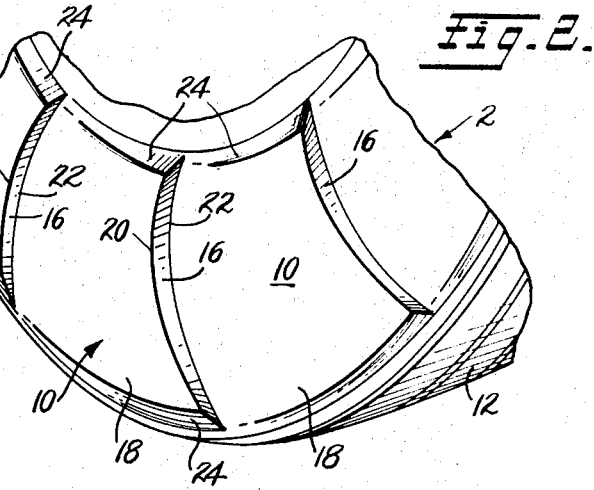
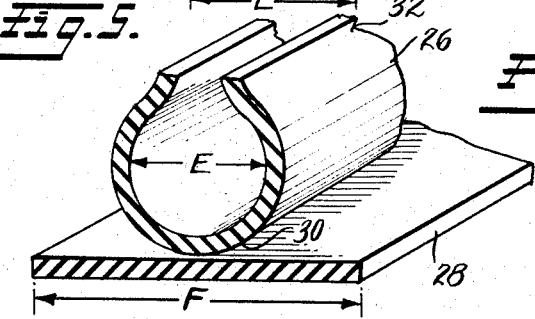
INVENTOR.
PAUL H. MacMAHON
BY
Bacon & Thomas
ATTORNEYS INVENTOR.
PAUL H. MacMAHON
BY
Bacon & Thomas
ATTORNEYS

United States Patent Office 3,529,792
Patented Sept. 22, 1970

3,529,792
PRE-ROTATABLE TIRE
Paul H. MacMahon, Arlington, Va., assignor of forty-nine percent to Gadsden E. Shand, Washington, D.C.
Continuation-in-part of application Ser. No. 573,544, Aug. 19, 1966. This application May 1, 1968, Ser. No. 725,721
Int. Cl. B64c 25/40
U.S. Cl. 244—103
6 Claims

ABSTRACT OF THE DISCLOSURE

An aircraft tire provided with wedge-shaped bar structures on the sidewalls thereof, the front face of each structure being flat and lying on a diameter of the tire and facing the flow of air moving over the tire during the aircraft's landing approach. Impingement of the air flow on the front bar faces at the bottom of the tire sets the wheel to rotating prior to touchdown of the aircraft, whereby tire safety is increased and tire life is prolonged. In one embodiment the wedge-shaped bar structures are grooved longitudinally to provide a tire sidewall that can be more easily flexed, whereby the possibility of tire failure during an aircraft landing is minimized.

---

This application is a continuation-in-part of application Ser. No. 573,544, filed Aug. 19, 1966.

BACKGROUND OF THE INVENTION

Field of the invention

The present invention relates generally to a tire for use primarily by aircraft, which has a configuration whereby air moving over the tire before landing of the aircraft will effect pre-rotation of the aircraft wheel.

Description of the prior art

Jet propulsion technology, which has enabled aircraft to travel at very high air speeds, also has caused an increase in the landing speed of such aircraft to such an extent that the aircraft commonly is moving at speeds of 175 or more miles per hour when the aircraft tires touch the ground. When it is considered that a hurricane having a maximum wind speed of perhaps 125 miles per hour is one of the most destructive forces known to stationary objects, some idea can be gained of the destructive energy released when a jet aircraft traveling at a considerably greater velocity than hurricane winds touches the ground. One need only visit an airport where jet aircraft are landing to witness the burning and scorching of tires which takes place during touchdown, and the measurable number of seconds required for the circumferential velocity of the aircraft wheels to build up to the speed of the aircraft.

It is not uncommon today for a jet aircraft to get only one landing out of its tires, after which the tires must be recapped or replaced. The prospects for even higher air and landing speeds of aircraft are well-known, and the improvement of the strength and heat resistance of aircraft tires to take the resulting punishment is a subject for much current research.

The major amount of the heat and shock of landing high-speed aicraft is due to tire inertia, that is, to the fact that the tire is not rotating at the same speed as that of the aircraft when touchdown occurs, and it will be readily understood that pre-rotation of the tires to a speed corresponding to that of the aircraft before landing can serve to ease such heat and shock. It is obvious that the closer the speed of the tire circumference to the speed of the aircraft at touchdown, the less will be the heat and shock experienced by the tire.

Shock resulting from tire inertia has considerable effect on the aircraft itself and the people and things contained therein, and is responsible for much tire ballooning. It has been calculated that the drop of a fully-loaded commercial aircraft a distance of $\frac{1}{64}$ of an inch, the plane being stationary otherwise, and the level for all wheels, would instantly deflate the tires on the ground side by 34%. The displaced air in the tires would pass to other portions of the tire, causing ballooning at the top and sides. During present jet aircraft landings with almost stationary or non-rotating wheels, the forward vector of momentum of the aircraft adds to the vertical vector to produce a resultant vector at the lower front portion of the tires so great that the impact will often completely flatten the tire on the ground side. Such excessive ballooning may serve to blow out the tire, making complete replacement necessary. Pre-rotation of aircraft tires can minimize this ballooning, and can thus serve to extend tire life and promote air safety.

While the idea of pre-rotation of aircraft tires has been given recognition by the art, the solutions thus far proposed have not proven acceptable for one reason or another. Mechanical systems have been proposed to rotate the aircraft wheels before landing, but problems have been encountered in securing sufficient rotation of each wheel and in matching the speed of the individual wheels with each other and with the speed of the aircraft. Also, such mechanical systems require servicing at greater or less intervals, and take up spaced in the chamber to which the wheels are retracted in the plane.

Some experienced airplane pilots, under very favorable conditions, may give the aircraft a slight bounce when landing, allowing the tires to brush the ground first, then lifting the aircraft slightly from the ground to allow a few seconds for the tires to accelerate, then touching the ground again for the actual landing. As can be readily recognized, this operation requires great skill, and also an extra length of landing strip. It also can damage the tires, to a greater or less extent.

The use of wind-catching projections on the tires and wheels has also been proposed. For example, U.S. Pat. 1,833,019 proposed an aircraft tire designed for pre-rotation of the wheels, but so far as is known, this modification was never adopted commercially, perhaps because the concavity of the wind-catching surface caused a suction effect during part of the revolution of the tire. The use of wind-catching projections is a practical approach to solving the problem of pre-rotation, however, and it is to provide an effective and practical tire construction of this type that the present invention is directed.

SUMMARY OF THE INVENTION

In the present invention, an aircraft tire is supplied with one or more flat faced bar structures to catch the "wind" to which the bottom portion of the tire is exposed during aircraft flight, and with means to minimize the wind force to which the bar is exposed at the top portion of the tire. In this manner the aircraft tire and the wheel on which it is mounted can be pre-rotated before landing, and preferably will be moving at or near the landing speed of the aircraft when the aircraft first touches the ground, thus eliminating a substantial portion of the ground shock normally experienced.

The bar structures of the invention are mounted on one or both sidewalls of the tire, and generally cover the entire sidewall from the bead, where the tire meets the wheel, to the tread. The bar structures are uniquely shaped for optimum effect, and can be molded and vulcanized to the tire casing in a single operation, or molded on the tire during fabrication thereof.

The bar structures of the invention are wedge-shaped, and include an essentially flat front face which lies along a diameter of the tire, and which is perpendicular to the plane of the tire sidewall. The tire is mounted on its wheel so that the structure's flat face faces in the direction of airplane travel at the bottom of the tire; thus, when the aircraft is moving the face encounters air which is stationary, or which at least has a velocity in the direction of aircraft travel less than the velocity of the aircraft. This provides a backward force on the bottom of the tire and wheel, which is exerted over the radius of the wheel to urge the wheel to rotate. Because the structures are wedge-shaped no flat face is presented to the wind at the top of the tire, and thus any forces generated by the encounter of the projections at the top of the tire with the air passing the tire are less than the forces generated at the bottom of the tire. The result is that the tire is rotated in the direction required for landing.

The invention also contemplates that the wind force against the top of the tire can be further lessened by the use of a fender substantially enclosing the upper forward quarter of the tire or a group of tires. This fender can be supported from the axles of the wheel by any suitable means; for example, a pantograph or "lazy-tongs" arrangement can be employed to give enough clearance, say about 4 inches, between tire and fender for tire rotation when the wheels are lowered, but to reduce this clearance to a minimum, say about ⅛ inch, when the wheels are retracted, to minimize the space occupied in the wheel chambers of the aircraft.

The addition of the wedge-shaped structures to the tire sidewalls can decrease the flexibility of those sidewalls, to such an extent that in some instances undesirable results will be obtained. Specifically, if the tire sidewalls are not sufficiently flexible to allow necessary ballooning at touchdown, a blow-out or a tire failure due to shearing action between the tread and the sidewall can occur. To provide for those instances where sidewall flexibility is important, a modification of the invention has been conceived.

In the modification the wedge-shaped bar structures are each provided with a plurality of spaced arcuate grooves, drawn on radii emanating from the center of the tire. The grooves extend through the thickness of the wedge-shaped structures, and serve to render the tire sidewalls more flexible without impairing the effectiveness of the pre-rotation feature of the invention.

The landing speed of the aircraft is the prime determinant of the wind pressure to which the wedge-shaped bar structures are exposed, and the pre-rotation of the wheels effected by the action of the wind pressure serves to minimize the frictional shock and resulting heat and tire burning experienced when an aircraft with stationary or non-rotating wheels touches the ground. Also, such pre-rotation can provide for safer landings, particularly emergency landings in rough terrain, by enabling the wheels to roll over minor obstructions which otherwise would stop the aircraft and cause nosing over. Another advantage of pre-rotation occurs when an aircraft lands in a downpour of rain. Normally, the impact of an aircraft with stationary or non-rotating wheels on a wet runway can cause a great splash of water to be directed to the air intake of the jet engine. With pre-rotating wheels, the tires can serve to wash some of this water to the rear of the aircraft.

It is the principal object of the present invention to provide an aircraft tire with wind-catching means on the sidewall thereof, designed to provide effective rotation of an aircraft wheel prior to landing.

A further object is to provide an aircraft tire having such wind-catching means, but which still retains sidewall flexibility and other desirable tire characteristics necessary to the proper functioning thereof.

Yet another object is to provide a bar structure on a tire sidewall for catching wind passing the tire, shaped to maximize the effect of wind pressure at the bottom of the tire while minimizing such effect at the top of the tire.

Still another object is to provide such a bar structure on the side wall of a tire, designed to not unduly limit the flexibility of said sidewall.

Other objects and many of the attendant advantages of the present invention will become readily apparent from the following description of the preferred embodiments, when taken in conjunction with the attached drawings.

BRIEF DESCRIPTION OF THE DRAWINGS

FIG. 1 is a perspective view of a pair of aircraft wheels provided with tires made according to the present invention, looking from slightly behind the tires;

FIG. 2 is an enlarged, fragmentary side perspective view of the lower portion of one of the tires of FIG. 1, looking from slightly ahead of the tire;

FIG. 3 is a diagrammatic view of one step in a tire manufacturing process according to this invention;

FIG. 4 is a fragmentary side elevation view of the bottom portion of the tire of FIG. 2, showing the flat front face of the wedge-shaped bar structure as being disposed on a diameter of the tire;

FIG. 5 is a sectional view taken along the line 5—5 in FIG. 4, showing the wedge shape of the bar structures;

DESCRIPTION OF THE PREFERRED EMBODIMENTS

Figure 6:
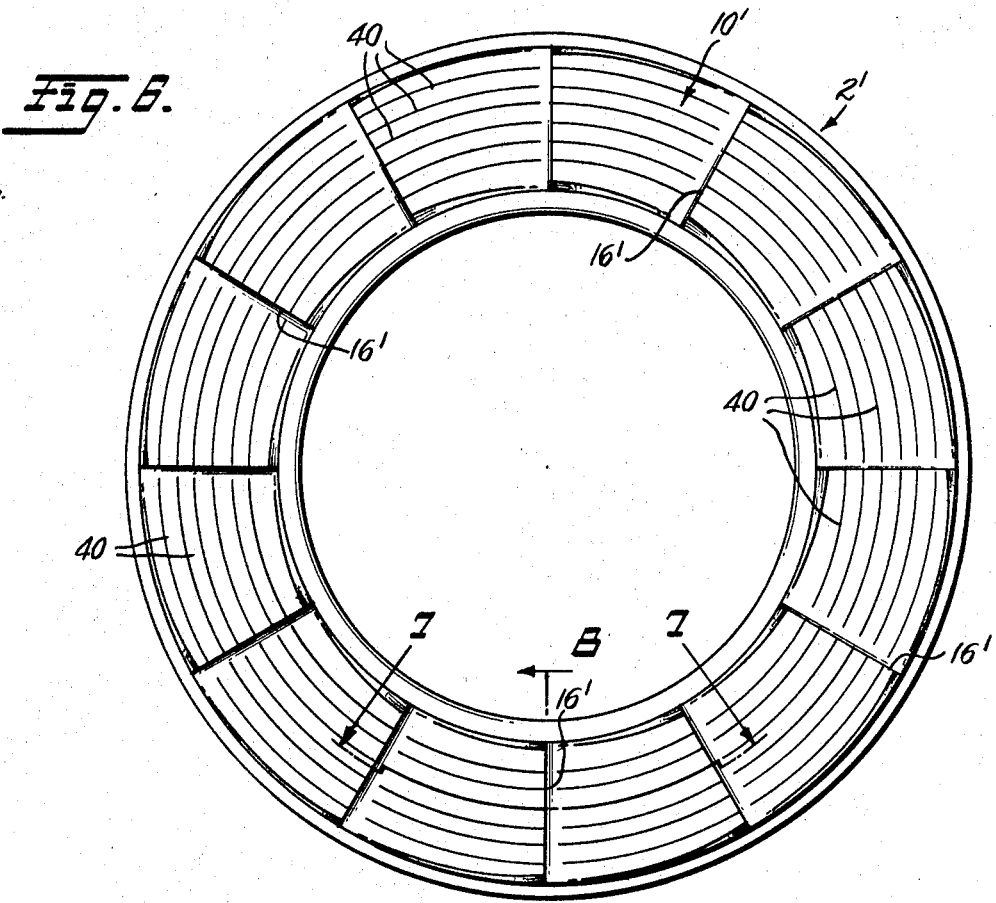
FIG. 6 is a side elevation view of a modified tire, wherein the bar structures are grooved to increase the flexibility of the tire sidewalls.

Referring now to FIGS. 1–5 of the drawings, a pair of identical tires 2 is shown mounted on wheels 4, which in turn are fastened in operative position to a truck 6. The sidewalls 8 of each tire 2 are provided with wedge-shaped, wind-catching bars 10, which advantageously cover the entire sidewalls of the tire between the tread 12 and the bead 14 thereof.

Each bar 10 has an essentially flat leading face 16 arranged to lie on a diameter D of the tire 2, and which extends substantially perpendicular to the plane defined by the side of the tire. The face 16 faces in the direction of aircraft travel at the bottom of the tire, which direction is indicated by the arrow A and is opposite to the direction of effective air flow when the aircraft is in flight, the direction of air flow being indicated by the arrow B. The wedge-shaped bars 10 each includes a ramp surface 18 that tapers uniformly from the bar leading face 16 to the outer surface of the tire casing. Typically, each wedge-shaped bar 10 will have a length L of about eight inches, with the face 16 projecting about one inch and the ramp surface 18 tapering at one-eight inch to the inch. Each ramp 18 terminates about three-fourths inch before the front flat face 16 of the next bar 10.

The tapered ramp surfaces 18 offer little resistance to air flow at the top of the tire, while the essentially flat faces 16, toward the bottom of the tire, are moved by the impingement of air or "wind" thereon flowing in the direction of the arrow B, to cause rotation of the tires 2 and the wheels 4 on which they are mounted in the direction of the arrow C. At the bottom of the tires 2, the ramp portions 18 may serve to guide the air to the flat face 16 of the next trailing wedge-shaped bar member 10.

As can be seen from the drawings, the leading face 16 of each bar 10 has an essentially flat surface which may be in the form of a curved trapezoid, the outer edge portion 20 of the face comprising the smaller of the two parallel outer and inner curves 20 and 22, respectively, of the trapezoid. This arrangement allows for tapering of the sides 24 of the bars 10 for essentially linear junction with the bead 14 and the tread 12 of the tire.

While the application of only one wind-catching bar 10 to one side of a tire can give the desired results, usually a plurality of wind-catching bars are applied to one or both sides of the tire casing, the flat front face 16 of each being placed along a diameter of the tire, being substantially perpendicular to the curved plane which defines the tire sidewall, and facing in the direction of aircraft travel at the bottom of the tire. The number of bars 10 to be employed, the choice of one or both sides of the tire, and the horizontal extension or projection of the front face 16 (the height of the trapezoid) will be determined by the pre-rotation speed desired. For example, one bar front face 16 one inch "high" and about eight inches in width W will supply eight square inches of wind-catching surface to a tire. A tire of size 13.50 x 16, which is used currently on the main wheels of some aircraft, will nicely accommodate twelve such wedge-shaped bar elements 10 on each side of the tire, and thus 192 square inches of wind-catching surface can readily be supplied per tire. Since but half of this total surface is facing forward at any one time, an average area of about 96 square inches of surface is available to catch the air flow past the aircraft in flight. On a typical nose wheel tire eight bars 10 can be accommodated per side, and will provide 64 square inches of flat front faces 16 for the air flow to react on and rotate the tire and its wheel. In each instance, the wind force exerted on the front face 16 acts over the radial distance to the center of the wheel to generate force for rotating the wheel.

In use, the wheels of the aircraft will be lowered long enough before the landing for them to achieve the desired rotational velocity. It appears advantageous to employ tires according to this invention having wedge-shaped bars 10 sufficient in size and number to pre-rotate the main wheels to the maximum speed at which the aircraft in question may land in the normal time that the landing gear is down. For slower landing speeds, the wheels can be slowed by partial application of the brakes which are present for all aircraft main landing wheels. Automatic devices known to the art can be employed for such purposes. For example, where an aircraft is to land at 300 miles per hour or 5 miles per minute, a tachometer and automatic braking device could hold 15 foot circumference main wheels to 1760 revolutions per minute. For the nose wheels, it appears desirable to adjust the speed of the pre-rotated wheels to, for example, about 20% below the landing speed of the aircraft.

The novel tire of this invention can be manufactured in a number of ways. The wedge-shaped bar members 10, made of any convenient material, preferably flexible enough to "give" with the tire casing when it budges, can be separately made and fastened individually to one or both sides of a tire. Advantageously, these elements will be made of rubber and can be vulcanized to the sidewall. Also, a disk-shaped member, having the hollow, rounded configuration of the tire sidewall, can be prepared containing the preferred number of wedge-shaped bar elements 10 on its outside, and having an inside configuration which is flat or in conformity with the sidewall of the tire. This disk-shaped element can be adhered to the sidewall in any convenient manner, as explained above. Further, the tire carcass can be manufactured with the wedge-shaped bar elements 10 as an integral part of the sidewalls.

Advantageously, the novel sidewall configuration of the invention can be imparted to a tire at the same time the tread 12 is applied, during original manufacture or recapping of the tire. A part of such process is illustrated in FIG. 3, wherein a tire carcass 26 is brought into contact with a piece of tire tread stock 28 in the usual manner for tread application. However, in this case the tread stock 28 is not merely the width E, of the bottom 30 of the carcass 26, but has a width F, sufficient to cover the tread width E plus at least one sidewall of the carcass 26, preferably by the bead 32. The piece of tread stock 28 is wound around the tire carcass 26 in the usual manner of tread manufacture. It is then placed in a mold where, under heat and pressure, the tread stock 28 is vulcanized to the carcass 26; however, this mold differs from the usual in having a die configuration not only in the portions of the mold which contact the tread part of the resulting tire, but also in those portions which are to form one or both sidewalls of the resulting tire. These latter die portions, of course, have a configuration which mates with the wedge-shaped bar element configuration to be given one or both sidewalls of the tire.

The sidewalls 8 of the tire 2 will normally be of the same thickness as those of a conventional tire, and thus the wedge-like bars 10 add to the total sidewall thickness. Because of the increased thickness added by the bars 10, the tires 2 thus will normally be reduced in wall flexibility over the flexibility present in the absence of the bars 10. Because of the need to accommodate tire distortions during an aircraft landing, such a decrease in flexibility may in some instances be undesirable.

Further, the solid wedge-shaped bars 10 themselves have limited flexibility. This could in certain instances result in their being separated from the more flexible sidewalls 8, during a sudden and severe ballooning or flatening of the tire 2. Under certain circumstances, it is also possible that the solid bars 10 would so brace the tire sidewalls 8 that the sidewalls would be sheared from the tread 12.

Figure 7:
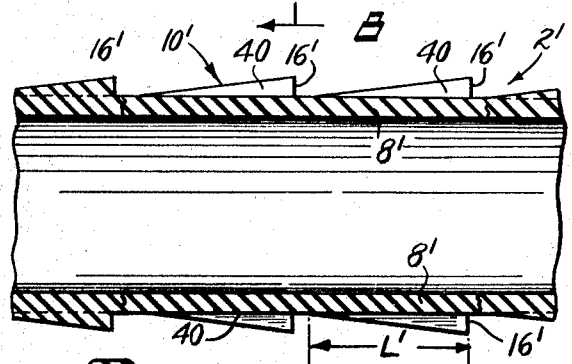
FIG. 7 is a sectional view taken on the line 7—7 of FIG. 6, showing the depth of the grooves in the bar structures.
Figure 8:
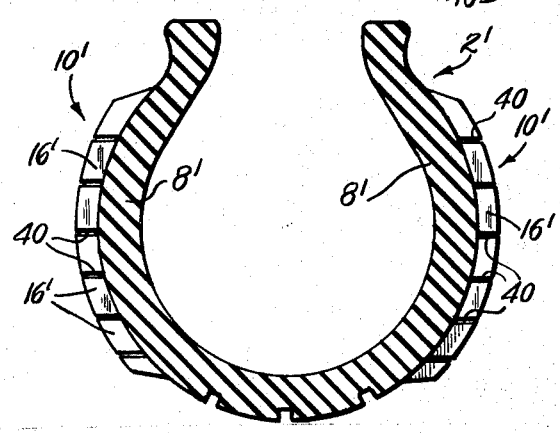
FIG. 8 is a cross-section through the tire of FIG. 6 showing the construction thereof, taken on the line 8—8 in FIG. 6.

To prevent these problems from occurring in those instances where they might be possible a modification of the invention has been conceived, such being shown in FIGS. 6–8. In said FIGS. 6–8 a tire 2' is shown having wedge-shaped wind bars 10' formed on the sidewalls thereof, the bars 10' including front faces 16' positioned on diameters of the tire, and being identical in shape and purpose to the wedge-shaped bars 10 of FIGS. 1, 2, 4 and 5.

In FIGS. 6–8, however, the wedge-shaped bars 10' each has a plurality of arcuate grooves 40 therein, each drawn on a radius from the center of the tire. Each groove 40 extends the full length L' of its bar 10', and varies in depth from a maximum at the flat front face 16' of the bar to zero at the trailing edge of the bar structure. The grooves 40 extend through the complete thickness of their bars 10', so that the bottom thereof lies on the surface of the tire sidewall 8'.

The arcuate grooves 40 serve to make the wind-catching bars 10' flexible, whereby they can flex with the tire sidewall 8' during distortions of the tire 2' occurring during landing. The number of grooves 40 for each bar 10' can be varied, though it has been found that a radial spacing of one inch between grooves will give satisfactory results.

The grooves 40 can be formed in the bars 10' after the latter have been molded, and can be mere slices, or of a measurable width, say about $\frac{1}{16}$ inch in width. The provision of grooves 40 of measurable width has an added advantage in providing for air flow along the length of the bars 10', which will tend to eliminate any undesirable vacuum pockets that might form. Obviously, the provision of narrow grooves 40 has no appreciable effect on the functioning of the flat front faces 16'.

The tire 2' of FIGS. 6–8 thus achieves the pre-rotation objects of the invention, and also is sufficiently flexible to ensure proper tire functioning under those conditions where the tire 2 might be subject to failure.

It is seen that the tires 2 and 2' of the invention, being pre-rotatable on an aircraft before landing, offer many safety and economic advantages, while not adding significantly to tire cost or weight. The tires 2 and 2' can be manufactured wholly new, or the novel configuration of this invention can be imparted to existing tires during a recapping operation. It will be noted that the tires 2 and 2' are interchangeable from one wheel of an aircraft to another, so long as they are positioned for the flat face 16 or 16' of the wind-catching bars 10 or 10' to be directed in the direction of air flow at the bottom of the wheel. Thus, the tires 2 and 2' have a definite left-side and right-side. Where means such as fenders are provided to further minimize wind force against the top front portion of the tire, the tires 2 and 2' can be more freely interchanged.

Obviously, many modifications and variations of the present invention are possible in the light of the above teachings. It is therefore to be understood that the invention can be practiced otherwise than as specifically shown and described.

I claim:

1. A pre-rotatable tire for aircraft and the like, said tire including a tread portion, and a pair of sidewalls each extending generally radially inwardly from said tread portion and terminating in an annular bead portion, at least one sidewall of said tire having wind-catching means thereon, said means comprising: at least one bar structure carried by and secured to said sidewall and projecting laterally therefrom, said bar structure having a leading face for catching wind flowing past said tire, and having at least one longitudinally extending groove therein for improving the flexibility of said bar structure and the sidewall on which it is mounted and to provide a channel for air flow between said leading face and the rearward portions of said bar structure, said groove being arcuate and formed on a radius emanating from the center of said tire, and having a measurable width sufficient to provide for said air flow.

2. A pre-rotatable tire as recited in claim 1, wherein said wind-catching means comprises: a plurality of equally spaced, wedge-shaped bar structures carried by said sidewall, each bar structure including a flat leading face disposed on a diameter of said tire and extending substantially perpendicular from the plane of said sidewall, and a ramp surface that tapers inwardly from the outer edge of said flat leading face rearwardly to terminate at the sidewall of the tire a distance in front of the leading face of the bar structure therebehind, each of said bar structures having a plurality of said grooves therein.

3. A pre-rotatable tire as recited in claim 2, wherein said flat leading face extends radially for substantially the full distance from said bead portion to said tread portion.

4. A pre-rotatable tire as recited in claim 2, wherein the ramp surface of each bar structure termintes at least about three-fourths of an inch in front of the flat leading face of the bar structure therebehind.

5. A pre-rotatable tire as recited in claim 1, wherein said bar structure has a plurality of spaced grooves therein, each formed on a radius emanating from the center of said tire.

6. A pre-rotatable tire as recited in claim 1, wherein said longitudinally extending groove extends substantially completely through said bar structure.

References Cited

UNITED STATES PATENTS

| 2,403,309 | 7/1946 | Smith | 244—103 |
| 2,435,459 | 2/1948 | Oden | 244—103 |
| 2,737,422 | 3/1956 | Barnes | 301—37 |
| 3,233,849 | 2/1966 | Rubin | 244—103 |

FOREIGN PATENTS

| 1,160,467 | 3/1958 | France. |
| 417,890 | 2/1947 | Italy. |

MILTON BUCHLER, Primary Examiner

P. E. SAUBERER, Assistant Examiner